United States Patent
Mank

(10) Patent No.: US 9,699,134 B2
(45) Date of Patent: Jul. 4, 2017

(54) ELECTRONIC DEVICE FOR COMMUNICATION WITHIN A NETWORK AND METHOD FOR OPERATING AN ELECTRONIC DEVICE

(71) Applicant: Sony Corporation, Tokyo (JP)

(72) Inventor: Armin Mank, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/132,512

(22) Filed: Apr. 19, 2016

(65) Prior Publication Data

US 2016/0234156 A1 Aug. 11, 2016

Related U.S. Application Data

(63) Continuation of application No. 13/665,405, filed on Oct. 31, 2012, now Pat. No. 9,356,794, which is a
(Continued)

(30) Foreign Application Priority Data

Dec. 5, 2007 (EP) .................................. 07122406

(51) Int. Cl.
*H04L 29/12* (2006.01)
*H04L 12/28* (2006.01)
*H04L 29/06* (2006.01)

(52) U.S. Cl.
CPC ........ *H04L 61/106* (2013.01); *H04L 12/2805* (2013.01); *H04L 12/2836* (2013.01);
(Continued)

(58) Field of Classification Search
None
See application file for complete search history.

(56) References Cited

U.S. PATENT DOCUMENTS 5,982,753 A 11/1999 Pendleton et al.
6,574,664 B1 6/2003 Liu et al.
(Continued)

FOREIGN PATENT DOCUMENTS

CN 1969569 A 5/2007
EP 1 063 829 A2 12/2000
(Continued)

OTHER PUBLICATIONS

High-Definition Multimedia Interface. Specification Version 1.3a—Supplement 1 Consumer Electronics Control (CEC), XP009096686, URL http://www.hdmi.org/download/HDMISpecification13a.pdf, Nov. 10, 2006, pp. 1-277.
(Continued)

*Primary Examiner* — Robert M Morlan
(74) *Attorney, Agent, or Firm* — Oblon, McClelland, Maier & Neustadt, L.L.P.

(57) ABSTRACT

The present invention relates to an electronic device for communication within a network, comprising a first interface (6) enabling communication with at least one further electronic device (1a, 1b, 1c, 1d, 1e) within a network (8) according to a first communication standard, a storage (5) for storing a first address of the at least one further electronic device (1a, 1b, 1c, 1d, 1e), said first address relating to the first communication standard, and a controller (4) for requesting a second address from said at least one further electronic device (1a, 1b, 1c, 1d, 1e), said second address relating to a second communication standard within said network (8), wherein the second address is stored together with the first address in the storage (5).

Figure 1:
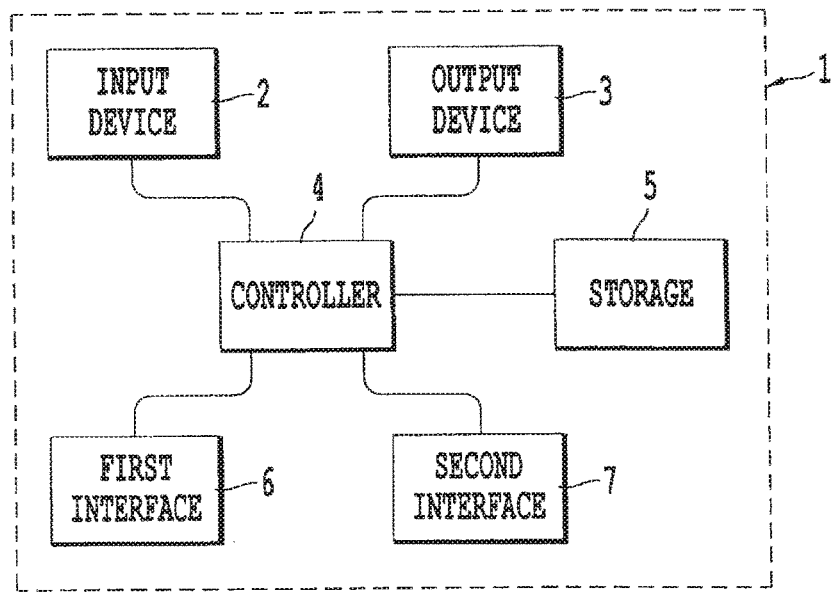

The present invention further relates to a method for operating an electronic device.

17 Claims, 2 Drawing Sheets

Related U.S. Application Data continuation of application No. 12/273,252, filed on Nov. 18, 2008, now Pat. No. 8,305,929.

(52) U.S. Cl.
  CPC ........ *H04L 69/18* (2013.01); *H04L 29/12037* (2013.01); *H04L 61/2092* (2013.01); *H04L 69/14* (2013.01)

(56) References Cited

U.S. PATENT DOCUMENTS

| | | | |
|---|---|---|---|
| 6,801,777 B2* | 10/2004 | Rusch | H04W 48/18 455/450 |
| 6,993,034 B1* | 1/2006 | Block | H04L 29/12783 370/390 |
| 7,583,677 B1 | 9/2009 | Ma et al. | |
| 7,996,869 B2 | 8/2011 | Tu et al. | |
| 2003/0112805 A1 | 6/2003 | Stanton | |
| 2003/0223377 A1 | 12/2003 | Simmons et al. | |
| 2004/0052214 A1 | 3/2004 | Teh et al. | |
| 2004/0184458 A1* | 9/2004 | Shimada | H04L 29/12009 370/392 |
| 2005/0165992 A1 | 7/2005 | Sauber | |
| 2007/0110080 A1 | 5/2007 | Bennett | |
| 2007/0192437 A1* | 8/2007 | Wang | H04L 12/12 709/219 |
| 2008/0172501 A1 | 7/2008 | Goodart et al. | |
| 2008/0172708 A1 | 7/2008 | Perry et al. | |
| 2008/0285576 A1 | 11/2008 | Teener et al. | |
| 2009/0003331 A1 | 1/2009 | Winter et al. | |

FOREIGN PATENT DOCUMENTS

| | | | |
|---|---|---|---|
| EP | 1 786 153 A2 | 5/2007 |
| EP | 1 786 153 A3 | 5/2007 |

OTHER PUBLICATIONS

Kobayashi, "DisplayPort Technical Overview," http://web.archive.org/web/2006072626222849/http://gnss.com/technology/DisplayPort+Technical+Overview+White+Paper.pdf, Jun. 26, 2006.

Office Action issued Jul. 2, 2012, in Chinese Patent Application No. 200810190812.1 (English language translation).

Extended European Search Report issued Jun. 10, 2015 in Patent Application No. 15152579.7.

* cited by examiner

ELECTRONIC DEVICE FOR COMMUNICATION WITHIN A NETWORK AND METHOD FOR OPERATING AN ELECTRONIC DEVICE

CROSS-REFERENCE TO RELATED APPLICATIONS

This application is a continuation of U.S. application Ser. No. 13/665,405, filed Oct. 31, 2012, currently pending, which is a continuation of U.S. application Ser. No. 12/273,252, filed Nov. 18, 2008, now U.S. Pat. No. 8,305,929. application Ser. No. 12/273,252 is based upon and claims the benefit of priority from prior European Patent Application No. 07 122 406.7, filed Dec. 5, 2007. The entire contents of the foregoing applications are hereby incorporated by reference into the present disclosure.

The present invention relates to an electronic device for communication within a network and to a method for operating an electronic device. Specifically, the present invention relates to the field of communication according to different communication standards.

In general, electronic devices are used in a wide field of applications. Such electronic devices may for example be a personal computer, a television, a video-recorder, a DVD or HDD recorder, facsimile devices, digital cameras, mobile terminals for wireless communication or other electronic consumer devices. An important task in developing electronic devices is to enable the devices to be connected to a network or to other electronic devices and to communicate with each other.

When connecting electronic devices either directly or via a network the used communication standard sometimes does not fulfill all the requirements which are needed for effectively communicating within the network. For example electronic devices may be connected to each other using a communication standard with a very low bandwidth. In this case the communication standard is not adapted to other applications which require a higher bandwidth.

It is therefore the object of the present invention to provide an electronic device as well as a method for operating an electronic device enabling an efficient use of capacities on a network and an enhanced communication.

This object is solved by an electronic device for communication within a network according to claim 1 and by a method for operating an electronic device according to claim 13.

The present invention relates to an electronic device for communication within a network. comprising a first interface enabling communication with at least one further electronic device within a network according to a first communication standard, a storage for storing a first address of the at least one further electronic device, said first address relating to the first communication standard, and a controller for requesting a second address from said at least one further electronic device, said second address relating to a second communication standard within said network, wherein the second address is stored together with the first address in the storage.

The present invention further relates to a method for operating an electronic device for communication within a network, comprising the steps of providing a first interface enabling communication with at least one further electronic device within a network according to a first communication standard, storing a first address of the at least one further electronic device in a storage, said first address relating to the first communication standard., and requesting a second address from said at least one further electronic device, said second address relating to a second communication standard within said network (8), and storing the second address together with the first address in the storage.

Preferably, the electronic device comprises a second interface enabling communication with the at least one further electronic device within the network according to the second communication standard.

The controller can be adapted to send the request for the second address via the first interface. Alternatively, the controller can be adapted to send the request for the second address via the second interface.

Advantageously, the second interface enables communication with a high bandwidth.

Further, advantageously, the second interface enables a communication based on the Ethernet standard.

The controller can be adapted to request a single second address from a single further electronic device. Hereby, the controller is preferably adapted to request from each further electronic device the respective second address.

Alternatively, the controller is adapted to request a list comprising all first and second addresses of all further electronic devices from a single further electronic device.

Advantageously, the first interface enables transmission and reception of control functions.

Further, advantageously, the first interface enables communication according to the consumer electronics control CEC standard.

Preferably, the first address is a CEC logical address and the second address is an IP Ethernet address.

Figure 2:
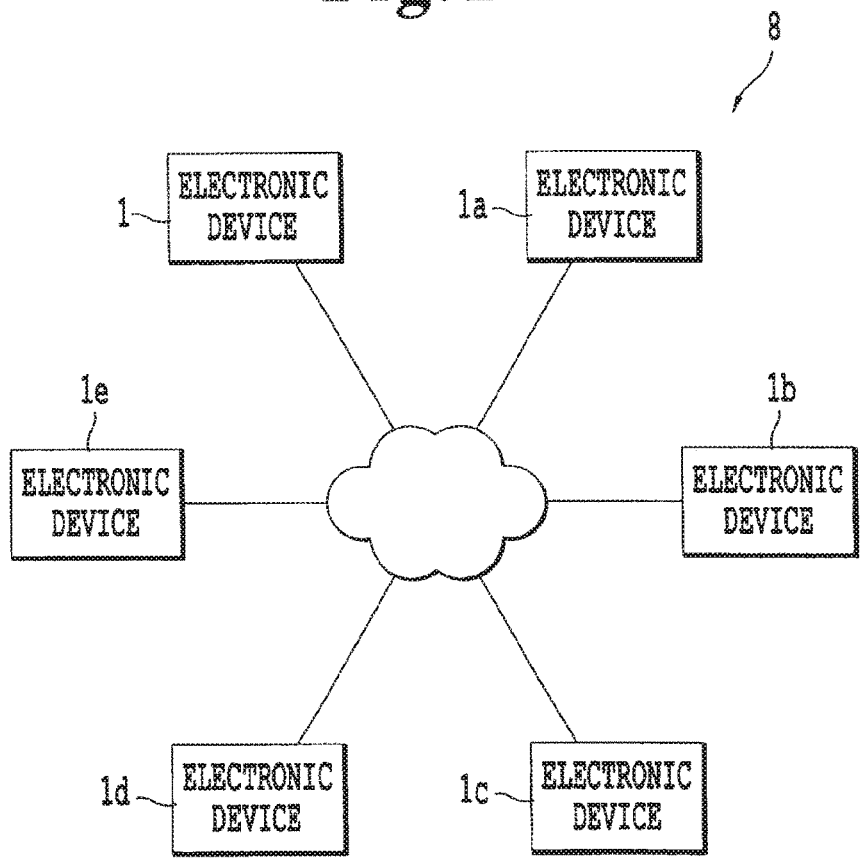
Figure 3:
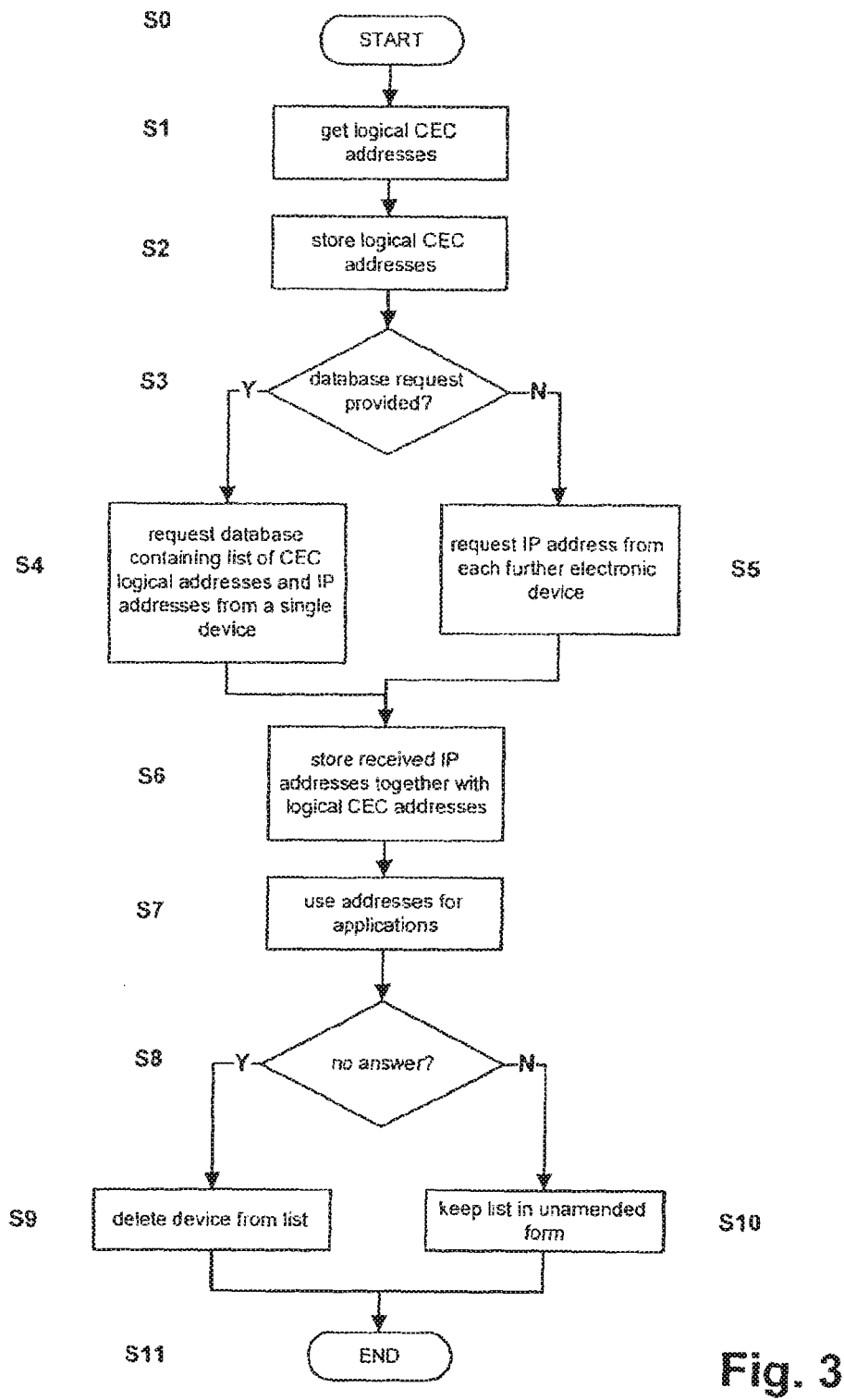

The present invention will now be explained in more detail in the following description of preferred embodiments in relation to the enclosed drawings in which FIG. 1 shows a schematic block diagram of an electronic device according to the present invention, FIG. 2 shows a network comprising the electronic device according to the present invention, and FIG. 3 is a flow-chart showing the process steps of a method according to the present invention.

FIG. 1 is a schematic block diagram showing the elements of an electronic device 1 according to the present invention. The electronic device 1 comprises an input means 2 for enabling input of data and/or information by a user. The input means 2 may be a keyboard, a mouse, a touchpad, recognition of speech, an interface for receiving data input over a remote controller, for example an infrared interface, or any other interface enabling the user to input data/or information or to select applications or programs. In addition. the main electronic device 1 comprises an output means 3 for outputting data and/or information to a user. The output means 3 may be a display, light emitting diodes (LED), a loudspeaker or any other graphical user interface adapted to output data and/or information to the user.

A storage 5 is further provided for temporally or permanently storing data, information, programs, applications and the like. The storage 5 hereby may be divided into different storage spaces each providing different types of memory. i.e. a random access memory RAM, a flash memory or other types.

The input means 2, the output means 3 and the storage 5 are all connected to and in data communication with a controller 4. The controller 4 hereby controls and supervises the transmission and processing of data and/or information within the electronic device 1. The controller 4 further supervises the operation of the electronic device 1.

In addition, the electronic device 1 comprises a first interlace 6 and a second interface 7 both enabling a communication of the electronic device within a network 8 with at least one further electronic device. The first interface 6 and the second interlace 7 can both be adapted to enable either a wireless or wired connection within the network 8. Alternatively, each interlace may comprise a multitude of interfaces each being adapted to communicate with different hunter electronic device. The first interface 6 and the second interface 7 are also connected to and in data communication with the controller 4.

FIG. 2 shows the electronic device 1 according to the present invention and several further electronic devices 1a to 1e which are all connected to the network 8. Alternatively, the electronic devices can be connected directly with each other. According to the present invention the communication within the network 8 can be accomplished by using at least two different communication standards. Specifically according to the present invention the electronic devices 1, 1a to 1e can communicate according to a first communication standard and according to a second communication standard. Hereby, the electronic device 1 and the further electronic devices 1a to 1e each have a first address within the network 8 relating to the first communication standard and a second address within the network 8 relating to the second communication standard. The first communication standard hereby is a slow connection having a slow bandwidth and the second communication standard is a fast connection having a high bandwidth, Specifically, the first communication standard is a communication according to the consumer electronics control (CEC) standard and the second communication standard is a communication based on an Ethernet connection. Specifically, the first interface 6 provides a HDMI connection having an additional CEC line.

The first interface 6 of the electronic device 1 hereby enables a communication according to the first communication standard and the second interface 7 of the electronic device enables a communication according to the second communication standard. By using two different communication standards and connecting the electronic devices 1, 1a to 1e via a network 8 thereby enabling communication using different communication standards, the advantages of the different used communication standards can be combined, so that for example a communication standard having a low bandwidth can use the other communication standard when the need arises to transmit large amounts of data.

The present invention further provides a possibility to administrate the addresses of each electronic device 1, 1a to 1e connected to the network 8 and using different communication standards.

In the following, the present invention will be explained, whereby the first communication standard is a communication standard relating to the consumer electronics control (CEC) standard and the second communication standard is related to a communication based on an Ethernet connection, The first address is hereby a CEC logical address and the second address is an IP Ethernet address. Nevertheless, the present invention is not intended to be limited to the above types of communication standards hut can be adapted to any other type of communication standard. Further, the present invention is not limited to the use of two different communication standards but can also adopt three or more communication standards. In this case in the electronic device 1a third or more interfaces can be provided.

The method of the present invention will now be explained with reference to FIG. 3, The process begins in step S0 for example with switching on the electronic devices 1, 1a to 1e connected via the network 8.

In order to enable a communication according to the CEC standard, the electronic device has to get the logical addresses of all connected further electronic devices 1a to 1e in order to enable a proper communication within the network 8. The electronic device 1 therefore can send polling messages to all logical addresses within the network 8 in order to receive an answer from each further electronic device 1a to 1e reporting the respective CEC logical address. Otherwise each further electronic device 1a to 1e can automatically send a message reporting the logical address to which it is connected after being switched on. The same applies in case that an electronic device 1a to 1e is newly connected to the network 8. In this case the newly connected electronic device 1a to 1e will report its logical address to the other devices 1, 1a to 1e connected to the network 8.

In the next step S2 the electronic device 1 will store the received logical CEC addresses in the storage 5. In order to enable the electronic device 1 to use the second interface and the second communication standard, namely the Ethernet connection, also for the purposes of transmissions according to CEC applications, the electronic device 1 has to link the respective CEC logical addresses to the respective IP addresses within the Ethernet connection. This list of CEC addresses and corresponding IP Ethernet addresses is stored in a database. The electronic device 1 therefore checks if it is possible to get the whole database from a single further electronic device 1a to 1e or if it is necessary to request the Ethernet IP address from each further electronic device 1a to 1e separately. The electronic device 1 therefore in step S3 checks whether a database request is provided.

If a database request is possible then the electronic device 1 in the next step requests the database containing a list of all CEC logical addresses and of all IP addresses from a single further electronic device 1a to 1e. That means that a single further electronic device 1a to 1e holds the whole database comprising the list of CEC and IP addresses and is adapted to transmit the whole list upon request.

Otherwise if no database request is provided then in the next step S5 the electronic device will send a request to each of the further electronic devices 1a to 1e thereby requesting from each further electronic device 1a to 1e the respective IP Ethernet address.

A first possibility for requesting the second address is to use the first interface 6. The electronic device 1 hereby uses the first interface 6 and the CEC communication standard for sending a request for the IP addresses. Here fore new CEC commands and answers could be adopted. In order to request the whole database a command "get database" could be adopted. Likewise in order to request each address separately the command "get IP address" could be adopted. Further it is possible that the electronic device 1 sends the request for the database to one specific further electronic device in case the electronic device 1 knows that there is a specific further 1a to 1e electronic device 1a to 1e holding the database and being adapted to send the whole database. Otherwise the electronic device 1 will broadcast the request for the database via the network 8 and wait for an answer.

A second possibility for requesting the second address is to use the second interface 7. In this case the IP address is requested via an Universal Plug and Play (UPnP) mechanism and the traffic goes over the Ethernet connection, i.e. over the second interface 7. In answer to the request a device description file, e.g. a XML file, can be received comprising all necessary information such as the IP address and the CEC logical address. That means, that the further electronic device 1*a* to 1*e* links its own first address to its own second address and is adapted to send a file comprising both addresses.

In the next step S6 the electronic device 1 will store the received IP Ethernet addresses together with the logical CEC addresses in order to have a link between the logical CEC addresses and the IP addresses. With this list the electronic device 1 is adapted to look up which IP address belongs to which CEC address and can thereby use the Ethernet connection for CEC features.

In the next step S7 after the list has been stored in the storage 5 the electronic device 1 can use the different addresses for applications. For example at present when using a combined HDMI and CEC connection is was only possible to transmit the HDMI signal into one single direction. Since the present invention now adopts the possibility of additionally using a fast Ethernet connection the HDMI signal can now be sent in both directions over the Ethernet. Further it is possible to transmit commands and data relating to sound or other media related data via the Ethernet connection. This results in a reduction of the cables and connections which are necessary between the different electronic devices 1*a* to 1*e*.

In the next step S8 the electronic device 1 checks if one of the further electronic devices 1*a* to 1*e* did not answer upon sending a request or polling message. In case this further electronic device 1*a* to 1*e* did not answer then in the next step S9 the respective further electronic device is deleted front the list stored in the storage 5. Otherwise, if all further electronic 1*a* to 1*e* devices keep answering then in the next step S10 the list is kept in unamended form. Additionally, in case a device gets newly connected, then this device after having reported its CEC logical address will be requested to also transmit its IP address and the electronic device 1 will update the list stored in the storage.

The process ends in step S11 for example with switching off the electronic devices 1, 1*a* to 1*e*.

In order to simplify the handling it is possible to use one single connector which comprises the cables and connections for the Ethernet connection as well as for the CEC connection. Thereby the user is enabled to connect the different electronic devices via one single cable but has the possibility to use a wide variety of communication standards in order to have large possibilities of using his system of electronic devices.

Further, it is to be noticed that even though the present invention was described only with reference to one single electronic device 1, it is clear that each of the further electronic devices 1*a* to 1*e* connected to the network can be adapted to carry out the same steps as the described electronic device 1, so that each of the further electronic devices also holds a list of CEC addresses and associated IP addresses in order to use the Ethernet connection.

The invention claimed is:

1. An electronic device for communicating with at least one further electronic device Ti a network, wherein each of said electronic device and said at least one further electron device has a first network address within the network for use with a first communication standard and a second network address within the network for use with a second communication standard, the electronic device comprising:
    a first interface configured to communicate with said at least one further electronic device within the network according to the first communication standard, which supports a first communication bandwidth, using the first network address of the at least one further electronic device;
    a second interface configured to communicate with the at least one further electronic device within the network according to the second communication standard, which supports a second communication bandwidth that is greater than the first communication bandwidth, using the second network address of the at least one further electronic device; and
    a storage configured to store the first network address of the at least one further electronic device and store the second network address of the at least one further electronic device together with the first network address of the at least one further electronic device,
    wherein the electronic device is configured to send a request, via the first interface and addressed with the first network address of the at least one further electronic device, for the second network address of the at least one further electronic device for communicating over the second interface with the at least one further electronic device.

2. The electronic device according to claim 1, wherein the electronic device is configured to request the second network address from a single other electronic device within the network.

3. The electronic device according to claim 1, wherein the electronic device is configured to request respective second network addresses from each of a plurality of electronic devices within the network.

4. The electronic device according to claim 1, wherein the first interface enables transmission and reception of control functions.

5. The electronic device according to claim 1, wherein the first network address is a Consumer Electronics Control (CEC) logical address and the second network address is an Ethernet address.

6. The electronic device according to claim 1, wherein the first communication standard is a High-Definition Multimedia Interface/Consumer Electronics Control (HDMI/CEC) standard, and the second communication standard is Ethernet.

7. The electronic device according to claim 1, further comprising circuitry configured to receive an input from a user.

8. The electronic device according to claim 7, wherein the input from the user comprises an input made by the user through at least one of a remote control, a keyboard, a mouse, a touch pad or speech recognition.

9. The electronic device according to claim 1, further comprising circuitry configured to output an output to a user.

10. The electronic device according to claim 9, wherein the circuitry configured to output the output comprises at least one of a light-emitting diode, a display or a speaker.

11. A method for communicating by an electronic device with at least one further electronic device within a network, wherein each of said electronic device and said at least one further electronic device has a first network address within the network for use with a first communication standard and a second network address within the network for use with a second communication standard, the method comprising:
    communicating with the at least one further electronic device within the network via the first interface of the electronic device, the first interface being configured to communicate according to the first communication standard, which supports a first communication bandwidth, using the first network address of the at least one further electronic device;
    communicating with the at least one further electronic device within the network via the second interface of the electronic device, the second interface being configured to communicate according to the second communication standard, which supports a second communication bandwidth that is greater than the first communication bandwidth, using the second network address of the at least one further electronic device;

sending a request, via the first interface and addressed with the first network address of the at least one further electronic device, for the second network address of the at least one further electronic device for communicating over the second interface with the at least one further electronic device; and storing, in the electronic device, the first network address of the at least one further electronic device and storing, in the electronic device, the second network address of the at least one further electronic device together with the first network address of the at least one further electronic device.

12. The method according to claim 11, wherein
the first network address is a Consumer Electronics Control (CEC)logical address and the second network address is an Ethernet address.

13. The method according to claim 11, wherein
the first communication standard is a High-Definition Multimedia Interface/Consumer Electronics Cannot (HDMI/CEC) standard, and the second communication standard is Ethernet.

14. The method according to claim 11, further comprising:
requesting a single one of said second network address from a single one of said at least one further electronic device within the network.

15. The method according to claim 11, further comprising:
requesting respective ones of said second network addresses from each of a plurality of said further electronic devices within the network.

16. The method according to claim 11, wherein
the first interface of the electronic device enables transmission and reception of control functions.

17. An electronic device for communicating with at least one further electronic device within a network, wherein each of said electronic device and said at least one further electronic device has a first network address within the network for use with a first communication standard and a second network address within the network for use with a second communication standard, the electronic device comprising:

first means for communicating with the at least one further electronic device within the network according to the first communication standard, which supports a first communication bandwidth, using the first network address of the at least one further electronic device;

second means for communicating with the at least one further electronic device within the network according to the second communication standard, which supports a second communication bandwidth that is greater than the first communication bandwidth, using the second network address of the at least one further electronic device;

means for sending a request, via the first interface and addressed with the first network address of the at least one further electronic device, for the second network address of the at least one further electronic device for communicating over the second interface with the at least one further electronic device; and means for storing the first network address of the at least one further electronic device and for storing the second network address of the at least one further electronic device together with the first network address of the at least one further electronic device.

* * * * *